(12) United States Patent
Waldron et al.

(10) Patent No.: US 8,997,877 B2
(45) Date of Patent: Apr. 7, 2015

(54) RISER COMPONENTS AND METHODS FOR MAKING THE SAME

(75) Inventors: Douglas J. Waldron, Fountain Valley, CA (US); Keith McTernan, Huntington Beach, CA (US); Scott Forrest, Santa Ana, CA (US)

(73) Assignee: Advanced Joining Technologies, Inc., Santa Ana, CA (US)

( * ) Notice: Subject to any disclaimer, the term of this patent is extended or adjusted under 35 U.S.C. 154(b) by 230 days.

(21) Appl. No.: 13/080,596

(22) Filed: Apr. 5, 2011

(65) Prior Publication Data

US 2011/0240304 A1 Oct. 6, 2011

Related U.S. Application Data

(60) Provisional application No. 61/341,849, filed on Apr. 5, 2010.

(51) Int. Cl.
*E21B 17/12* (2006.01)
*F16L 13/007* (2006.01)
*B21K 25/00* (2006.01)
(Continued)

(52) U.S. Cl.
CPC .............. *F16L 13/007* (2013.01); *B21K 25/005* (2013.01); *B23P 11/005* (2013.01); *F16L 1/15* (2013.01); *F16L 13/141* (2013.01); *F16L 23/024* (2013.01); *F16L 23/028* (2013.01)

(58) Field of Classification Search
USPC .................. 166/360, 367, 378–380, 242.1
See application file for complete search history.

(56) References Cited

U.S. PATENT DOCUMENTS 2,216,468 A * 10/1940 Farrar .................. 29/890.14
2,310,158 A * 2/1943 Austin ................... 219/154
(Continued)

FOREIGN PATENT DOCUMENTS

CN 1451506 A 10/2003
GB 858 121 A 1/1961
(Continued)

OTHER PUBLICATIONS

International Search Report for Application No.: PCT/US2011/031305 Dated Jul. 21, 2011.

*Primary Examiner* — Matthew Buck
*Assistant Examiner* — Aaron Lembo
(74) *Attorney, Agent, or Firm* — Janeway Patent Law PLLC

(57) ABSTRACT

A method for making a riser component includes: positioning a coupler adjacent and end of a tube such that a region of the coupler forms an interface with the tube's end, wherein the region includes a material (in some embodiments an aluminum alloy), and the tube's end includes a groove and another material (in some embodiments a steel alloy) that is different than the region's material; heating the region of the coupler to increase the region's malleability; and exerting pressure on the region of the coupler to plastically deform the region to insert some of the region's material into the groove in the tube's end. By fixing the coupler to the tube in this manner, the coupler may be strongly secured to the tube, and thus able to withstand high, dynamic loads frequently experienced in service. Also, the material of the coupler may be different than the material of the tube, and thus the material of the coupler may be lighter than the material of the tube. This allows one to design a riser component that is lighter than a conventional steel riser component having a steel tube and steel flanges, but that can withstand the high, dynamic loads frequently experienced in service.

20 Claims, 5 Drawing Sheets

(51) Int. Cl.
*B23P 11/00* (2006.01)
*F16L 1/15* (2006.01)
*F16L 13/14* (2006.01)
*F16L 23/024* (2006.01)
*F16L 23/028* (2006.01)

(56) References Cited

U.S. PATENT DOCUMENTS 3,967,840 A * 7/1976 McFall .......................... 285/222
4,183,562 A * 1/1980 Watkins et al. ................ 285/405
4,428,603 A * 1/1984 Davlin ........................... 285/368
7,774,917 B2 * 8/2010 Anderson et al. ............... 29/505
8,225,876 B2 * 7/2012 Mei ................................ 166/380
2007/0169939 A1 * 7/2007 Costa et al. .................... 166/302
2008/0264644 A1 * 10/2008 Sawtell .......................... 166/350

FOREIGN PATENT DOCUMENTS

JP 63084827 A * 4/1988 .............. B23P 11/02
WO WO2009077735 A1 6/2009

* cited by examiner

FIG. 1 (PRIOR ART)
FIG. 2
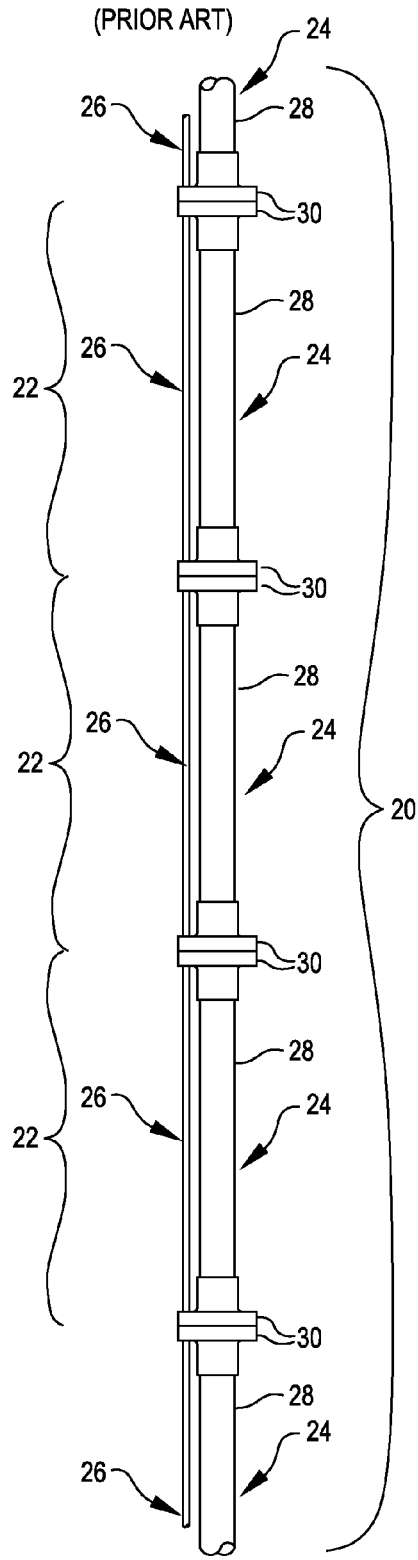
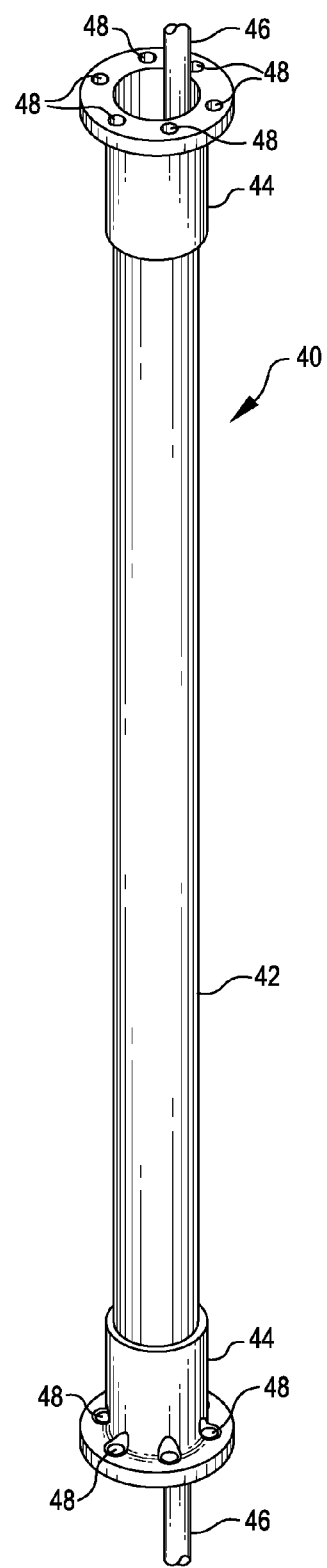

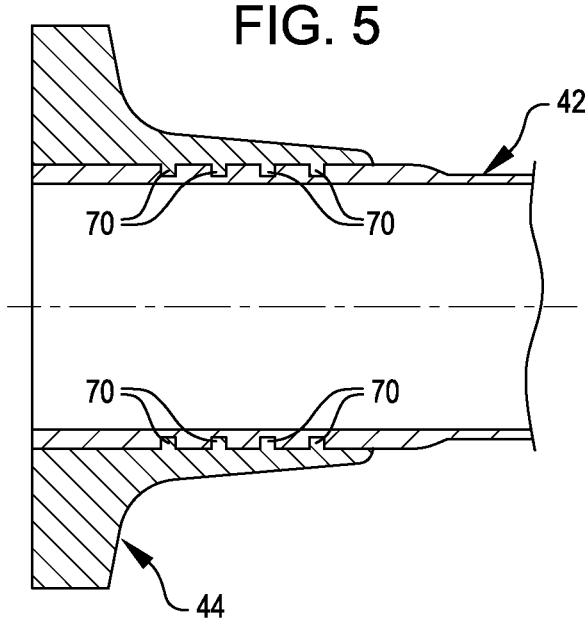
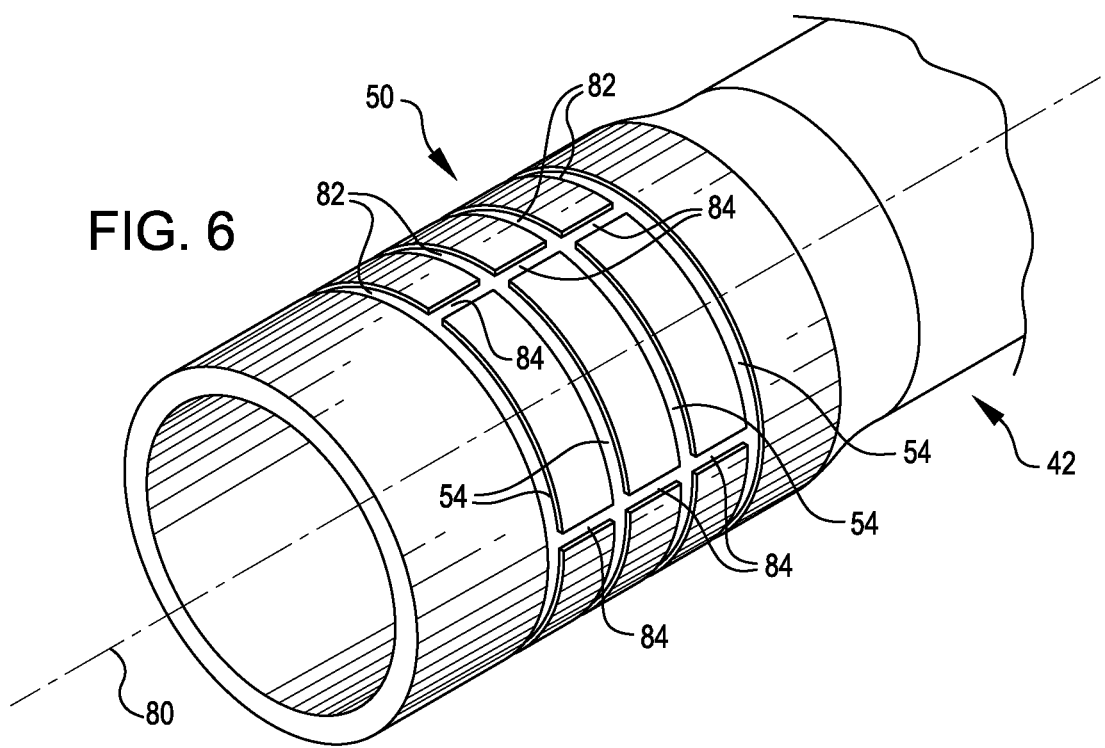

RISER COMPONENTS AND METHODS FOR MAKING THE SAME

CROSS REFERENCE TO RELATED APPLICATION AND CLAIM OF PRIORITY

This application claims priority from commonly owned U.S. Provisional Patent Application 61/341,849 filed 5 Apr. 2010, and titled "Riser System Components And Methods For Making The Same", presently pending, which is incorporated by reference.

BACKGROUND

Risers are vital to drilling and extracting oil and other materials from underneath the earth's surface. A riser is basically a tube that connects a well head to a control station where extraction, and, frequently, drilling operations are controlled. When extracting oil, natural gas and/or other materials from underneath the bottom of a body of water, such as a sea, ocean or lake, a riser connects the wellhead at the bottom of the sea, ocean or lake to a platform suspended at the surface of the sea, ocean or lake. In such systems, the riser protects the drill string that extends from the platform and through the wellhead, by encasing the drill string between the platform and wellhead. The riser also provides a conduit for drilling-mud to flow from the platform to the wellhead, and thus into the well. Drilling-mud helps control the pressure inside the well that would otherwise substantially drop because of the hole drilled into the earth. The riser also provides a conduit for the oil, natural gas, and/or other materials to flow from the wellhead to the platform where the oil, natural gas and/or other materials can be secured for subsequent use.

Most risers include a main line and one or more auxiliary lines. The main line encases the drill string as it extends from the platform to the wellhead, and contains the drilling-mud and/or oil and/or other materials as they flow to and from the wellhead and the control station. The one or more auxiliary lines are typically located adjacent and outside of the main tube, and encase control lines that extend from the platform to the wellhead. The control lines may be hydraulic lines, electrical and/or pneumatic lines that connect systems at the wellhead, such as a blowout preventer (BOP) that can cap the well in an emergency.

Most risers are assembled in the field by coupling riser sections together. For example, FIG. 1 shows a portion 20 of a riser that includes five riser sections 22 coupled end-to-end. Each section 22 includes a main line 24 and an auxiliary line 26. Each main line 24 includes a main tube 28 and a flange 30 fastened to each of the main tube's ends. Each of the flanges 30 are designed to be mounted to a flange of another main line 24 by bolts to form a section 22 of the riser. The auxiliary line 26 is typically secured to the flanges 30, but may also pass through a hole in two or more of the flanges 30 as it extends adjacent to two main tubes 28. In some risers the auxiliary line 26, similar to the main line 24, may include flanges attached to the auxiliary line's tube and that can be mounted to another flange of another auxiliary line to form a section of a riser.

Because the distance between the control center and the wellhead is often long—especially when the wellhead is located at the bottom of a sea, ocean or lake—most risers include hundreds of riser sections coupled end to end. When the riser is vertically oriented (as shown in FIG. 1), as is common when extending between a platform suspended at the surface of a sea, ocean or lake and a wellhead, the forces that a riser section experiences (and must withstand) include the weight of the other sections above the section, the weight of the water above the section, and the movement of the water through which the riser extends. To withstand these loads many riser sections include steel flanges welded to a steel main tube, and steel auxiliary lines. The steel riser sections with steel auxiliary lines provide much strength, but unfortunately they are also heavy, which causes the riser sections located near the wellhead to bear a significant amount of weight. To reduce weight, some riser sections include aluminum flanges welded to an aluminum main tube, and aluminum auxiliary lines. The aluminum riser sections, however, provide less strength than the steel riser sections. In response to this, some riser sections include steel flanges welded to a steel main tube, and aluminum auxiliary lines. The combination of a steel main line with an aluminum auxiliary line provides a compromise between high strength and light weight; however, when deeper water depths are experienced, a riser section that provides both, high strength and light weight is needed.

SUMMARY

In an aspect of the invention, a method for making a riser component includes: positioning a coupler adjacent and end of a tube such that a region of the coupler forms an interface with the tube's end, wherein the region includes a material (in some embodiments aluminum and its alloys), and the tube's end includes a groove and another material (in some embodiments steel and its alloys) that is different than the region's material; heating the region of the coupler to increase the region's malleability; and exerting pressure on the region of the coupler to plastically deform the region to insert some of the region's material into the groove in the tube's end. By fixing the coupler to the tube in this manner, the coupler may be strongly secured to the tube, and thus, able to withstand high, dynamic loads frequently experienced in service. Also, by fixing the coupler to the tube in this manner, the material of the coupler may be different than the material of the tube, and thus, the material of the coupler or tube may be lighter than the material of the tube or coupler, respectively. This, in turn, allows one to design a riser component that is lighter than conventional steel riser components having a steel tube and steel flanges, but can withstand the high, dynamic loads frequently experienced in service.

In another aspect of the invention, a riser component includes: a tube having an end that includes a material and a groove; a coupler having a region that includes another material different than the material of the tube's end; and wherein the coupler is attached to the tube's end by: positioning the coupler adjacent the tube's end such that the region of the coupler and the groove form an interface, heating the region of the coupler to increase the region's malleability, and exerting pressure on the region to plastically deform the region to insert some of the region's material into the groove.

BRIEF DESCRIPTION OF THE FIGURES

FIG. 1 is a perspective view of a section of a conventional riser.

FIG. 2 is a perspective view of a component of a riser, according to an embodiment of the invention.

FIGS. 3-5 are partial, cross-sectional views of the riser component shown in FIG. 2 at different three stages of a method for fixing a coupler to a tube, according to an embodiment of the invention. FIG. 3 shows a view of the riser component before the tube's end is inserted into the coupler, according to an embodiment of the invention. FIG. 4 shows a view of the riser component before a region of the coupler is inserted into a groove in the tube's end, according to an embodiment of the invention. And, FIG. 5 shows a view of the riser component after the region of the coupler is inserted into the groove in the tube's end, according to an embodiment of the invention.

FIG. 6 is a perspective view of the end of the tube of the riser component shown in FIG. 2, according to an embodiment of the invention.

DETAILED DESCRIPTION

Figure 3:
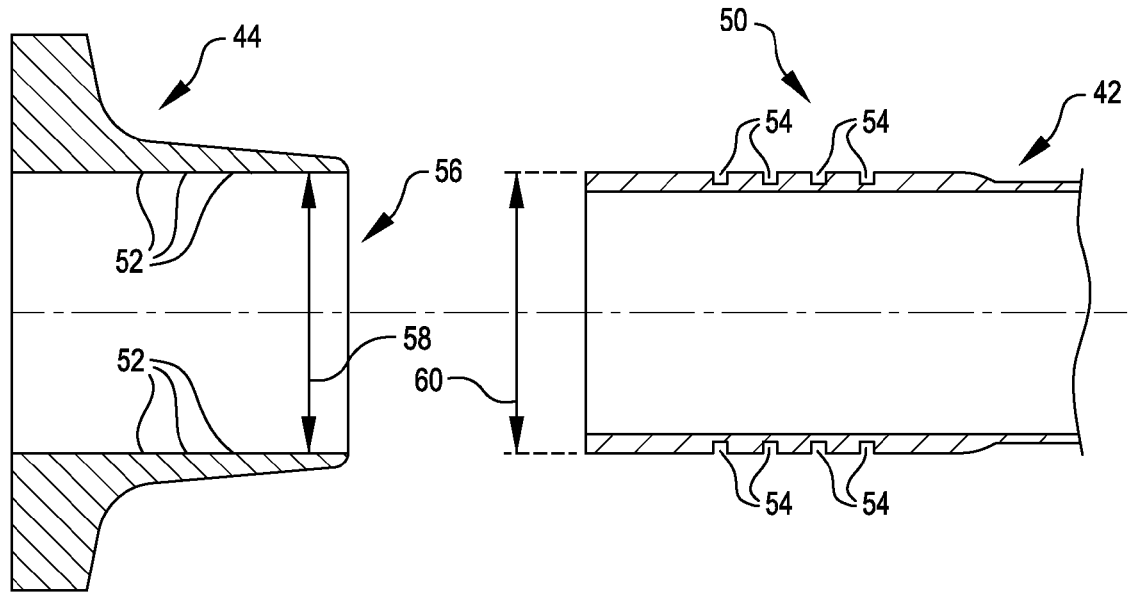

FIG. 2 is a perspective view of a component 40 of a riser, according to an embodiment of the invention. The riser component 40 is a component for a riser's main line, but in other embodiments may be a component for a riser's auxiliary line. The riser component 40 includes a tube 42, and a coupler 44 fixed to each end of the tube 42. The tube 42 provides a casing for a section of a drill string 46 to protect the section from damage that can be caused by the external environment, such as salt water, as the drill string section rotates and moves while drilling a well. The tube 42 also provides a conduit for drilling-mud and/or oil and/or other materials as they flow to and from a wellhead (not shown) and a control station (also not shown). Each of the couplers 44 facilitates coupling another riser component (not shown) to the riser component 40, and may also hold one or more auxiliary lines (not shown). By coupling many riser components together via their respective couplers, one can assemble a riser that connects a control station to a wellhead.

Each coupler 44 is fixed to a respective end of the tube 42 by heating a region of the coupler 44 to increase the region's malleability, and then inserting material from the region into a groove located in the respective ends (as discussed in greater detail in conjunction with FIGS. 3-6). By fixing each coupler 44 to the tube 42 in this manner, each coupler 44 may be strongly secured to the tube 42, and thus, able to withstand the high; dynamic loads frequently experienced in service where a wellhead is many feet (such as 7,000 feet) below a body of water's surface. Also, by fixing each coupler 44 to the tube 42 in this manner, the material of the coupler 44 may be different than the material of the tube 42 (in this embodiment the tube is a steel alloy and the coupler is an aluminum alloy), and thus the material of the coupler 44 or tube 42 may be lighter than the material of the tube 42 or coupler 44, respectively. This, in turn allows one to design a riser component that is lighter than conventional steel riser components having a steel tube and steel flanges, but can withstand the high, dynamic loads frequently experienced in service.

In this and other embodiments, each of the couplers 44 includes six holes 48 (only 9 labeled). When two riser components 40 are fastened to each other to form a portion of a riser, the holes 48 of a coupler 44 of one of the riser components 40 are aligned with the holes of a coupler of another component (not shown). Then, a bolt (not shown) is inserted through each of the aligned paired holes, and a nut (also not shown) is threaded onto each bolt to fasten the two riser components together. As shown in FIG. 2, the coupler 44 does not include a passage through which an auxiliary line may pass, or a portion to which an auxiliary line may be fastened. In other embodiments, however, the coupler 44 may include either or both.

Figure 4:
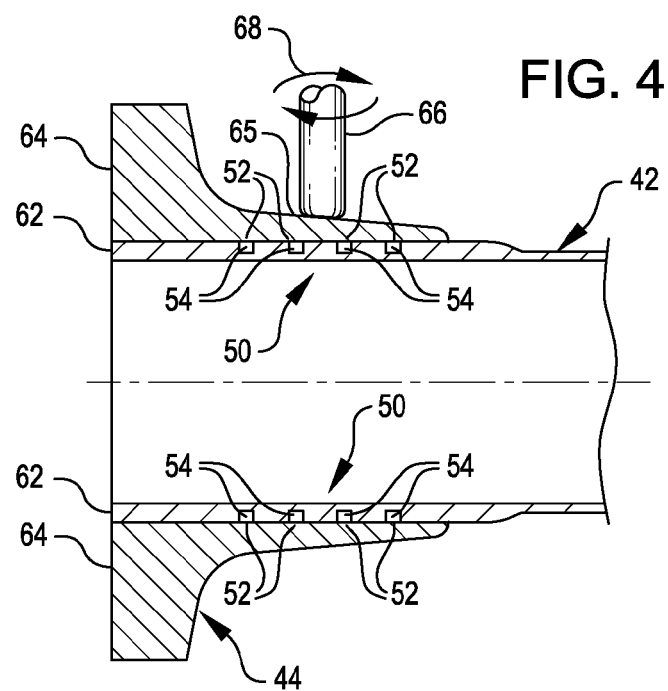

FIGS. 3-5 are partial, cross-sectional views of the riser component 40 shown in FIG. 2 at three different stages of a method for fixing the coupler 44 to the tube 42, according to an embodiment of the invention. FIG. 3 shows a view of the riser component 40 before the tube's end 50 is inserted into the coupler 44. FIG. 4 shows a view of the riser component 40 before a region 52 of the coupler 44 is inserted into a groove 54 in the tube's end 50. And, FIG. 5 shows a view of the riser component 40 after the region 52 of the coupler 44 is inserted into the groove 54 in the tube's end 50.

The material of the tube's end 50 and the material of the region 52 may be any desired combination of materials, such as steel and its alloys, aluminum and its alloys, titanium and its alloys, or composite materials. For example, in this and other embodiments, the material of the tube's end 50 includes a steel alloy, and the material of the coupler's region 52 includes an aluminum alloy, such as 7000 series aluminum, 6000 series aluminum, or 5000 series marine grade aluminum. In other embodiments, the material of the tube's end 50 may include a titanium alloy, and the material of the coupler's region 52 may include an aluminum alloy. In still other embodiments, the material of the tube's end 50 may include a composite, such as carbon fibers woven into a fabric that is in turn fixed to another fabric with an adhesive, and the material of the coupler's region 52 may include an aluminum alloy.

Referring to FIG. 3, in this and other embodiments of the method, the coupler 44 and the end 50 of the tube 42 are aligned so that the tube's end 50 may be inserted into the coupler 44. In this embodiment of the coupler 44, the coupler 44 includes a bore 56 sized to receive the end 50 of the tube 42. The bore 56 has a diameter 58, and, in this embodiment of the tube's end, the tube's end 50 has a diameter 60. The tube's end 50 also includes a groove 54 (here four) (discussed in greater detail in conjunction with FIG. 6.)

The diameter 58 of the bore 56 and the diameter 60 of the tube's end 50 may be any length desired that forms a close interface between the coupler's region 52 and the grooves 54 after the tube's end is inserted into the bore 56. For example, in this and other embodiments, the diameter 58 may be shorter than the diameter 60 by 0.00 inches to 0.030 inches. To insert the tube's end 50 into the bore 56 when the diameter 58 is shorter than the diameter 60, the coupler 44 may be heated to expand the bore 56, and thus lengthen the diameter 58. The temperature that the coupler 44 may be heated to should remain below the melting point of the coupler's material to avoid changes in the material's crystal structure that could adversely affect the strength and toughness of the material. After the tube's end 50 is inserted into the bore 56, the coupler is allowed to cool. This causes the bore 56 to contract, and thus shortens the diameter 58, around the tube's end 50. This choking of the tube's end 50 generates a compressive load in the tube's end 50 that helps the tube's end 50 withstand loads typically experienced in service.

In other embodiments, the diameter 58 may be longer than the diameter 60 by 0.00 inches to 0.030 inches. In such embodiments, the coupler 44 may or may not need to be heated before receiving the tube's end 50. If the coupler 44 does need to be heated before receiving the tube's end 50, then the coupler would not need to be heated to a temperature as high as the temperature required when the diameter 58 is shorter than the diameter 60.

Still referring to FIG. 3, a corrosion inhibitor (not shown) may be applied to the tube's end 50, the bore 56, and/or both to inhibit galvanic corrosion between the two dissimilar materials. For example, in this and other embodiments, a Teflon based coating is sprayed inside the bore 56, and onto the tube's end 50. The Teflon based coating provides adequate slip while inserting the tube's end 50 into the bore 56, and also prevents electrons from flowing from the steel material to the aluminum material.

Referring to FIG. 4, in this and other embodiments of the method, the tube's end 50 is inserted into the coupler's bore 56 to position the region 52 of the coupler 44 relative to the grooves 54 in the tube's end 50 such that the region 52 and grooves 54 form an interface. In this and other embodiments, the interface between the region 52 and the grooves 54 is formed when an edge 62 of the tube's end 50 is coplanar with the mounting surface 64 of the coupler 44. After the coupler 44 and tube 42 are positioned, heat is applied to the region 52 of the coupler 44 to increase the region's malleability.

The amount of heat applied may be any desired amount that causes the material in the region 52 to soften but not melt the region's material. For example, when the material in the region 52 is an aluminum alloy, the amount of heat applied may raise the temperature of the material to 600-1200 degrees Fahrenheit. By softening but not melting the region's material, one can plastically deform the region's material without causing significant adverse changes in the material's crystal structure. After the region's material is softened, pressure (2,000-60,000 pounds when the material in the region 52 is an aluminum alloy) is exerted on the coupler 44 to insert some of the region's material into one or more of the grooves 54 by plastically deforming the material.

Heat and pressure may be applied to the region 52 of the coupler 44 in any desired manner. For example, in this and other embodiments, heat and pressure are applied to the outside surface 65 of the coupler 44. More specifically, in this and other embodiments, a cylinder-shaped tool 66 that is harder than the material of the coupler 44 is pressed against the outside surface 65 of the coupler 44 and rotated in the direction of the arrow 68. As the tool 66 spins, the friction between the outside surface 65 and the tool 66 heats the material in the region 52. By controlling the rotational speed of the tool 66, and the pressure and friction between the outside surface 65 and the tool 66, one can control the amount of heat generated by the tool spinning against the outside surface 65. In some embodiments, the pressure applied to the tool 66 as the tool 66 spins may be sufficient to plastically deform some of the material in the region 52. If not, however, one can stop spinning the tool 66 once the region's material reaches the desired temperature, and increase the pressure that the tool 66 exerts on the outside surface 65.

Referring to FIG. 5, in this and other embodiments, some of the material 70 of the region 52 has been inserted into the grooves 54 to fix the coupler 44 to the tube 42. Because the material has been inserted by plastically deforming the material but not melting the material, the crystalline structure of the coupler's material in and around the grooves 54 retains much of its strength. Thus, the riser component 40 (FIG. 2) is more likely to withstand high, dynamic loads experienced in service without separating from the tube 42.

Any desired amount of material may be inserted into the grooves 54. For example, in this and other embodiments, material from the region 52 fills the grooves 54. In other embodiments, material from the region 52 may partially fill one or more of the grooves 54.

Other embodiments of the riser component 40 are possible. For example, the tube's end 50 may surround the coupler's region 52—i.e. the coupler 44 may be inserted into the tube 42. In such embodiments, the inside surface of the tube's end 50 may include the one or more grooves 54; or, the outside surface 65 may include the one or more grooves 54. As another example, the geometry of the bore 56 and the tube's end 50 may have an oval cross-section, or a rectangular cross-section, or any desired cross-section.

FIG. 6 is a perspective view of the end 50 of the tube 42 of the riser component 40 shown in FIG. 2, according to an embodiment of the invention. The grooves 54 receive material from the coupler 44 to fix the coupler 44 to the tube 42, and may be machined or rolled into the surface of the tube's end 50. If the tube's end 50 includes composite material, then the grooves 54 may be formed as part of the tube's end 50.

The grooves 54 may be oriented, as desired, on the tube's end 50 relative to the longitudinal axis 80. For example, in this and other embodiments, the grooves 54 include four first grooves 82 that each extend around the circumference of the tube's end 50 in a direction that is skewed relative to the direction of the longitudinal axis 80. More specifically, each of the four grooves 54 lie in respective planes that are substantially parallel with each other, and that each intersect the longitudinal axis 80 at substantially 90 degrees. After material from the coupler 44 has been inserted into the first grooves 82, the grooves 82 prevent the coupler 44 from moving relative to the tube's end 50 in the direction along the longitudinal axis 80. The grooves 54 also include two second grooves 84 that each extend in a direction parallel to the longitudinal axis 80, and thus perpendicular to the first grooves 82. After material from the coupler 44 has been inserted into the second grooves 84, the grooves 84 prevent the coupler 44 from rotating relative to the tube's end 50.

Other embodiments are possible. For example, the grooves 54 may include fewer or more first grooves 82, and one or more of the first grooves may extend in a direction other than the direction that the four first grooves 82 extend in. As another example, the grooves 54 may include fewer or more second grooves 84, and one or more of the second grooves may extend in a direction other than the direction that the two second grooves 84 extend in.

The grooves 54 may also be configured as desired. For example, in this and other embodiments, each of the grooves 54 includes a U-shaped cross-section having a depth of 0.125 inches and a width of 0.50 inches. In other embodiments, one or more of the grooves 54 may include a V-shaped cross-section. In still other embodiments, one or more grooves may include a cross-section that varies as the groove extends across the surface of the tube's end 50. For example, a groove 54 may initially include a U-shaped cross-section, and then when the groove 54 has extended about two feet, the groove 54 may include a V-shaped cross-section.

Figure 7:
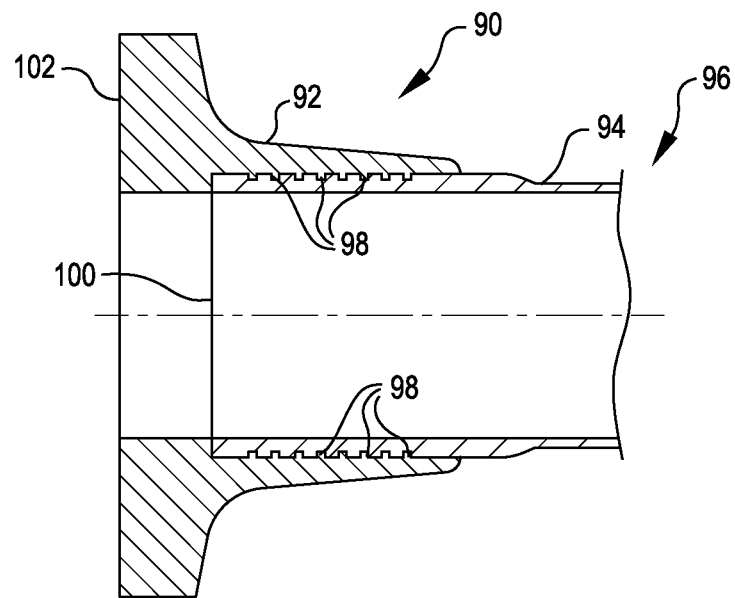
FIG. 7 is a partial, cross-sectional view of a riser component, according to another embodiment of the invention.

FIG. 7 is a partial, cross-sectional view of a riser component 90, according to another embodiment of the invention. The riser component 90 is similar to the riser component 40 discussed in conjunction with FIGS. 2-6. The riser component 90 includes a coupler 92 fixed to an end 94 of a tube 96 by inserting material from the coupler 92 into grooves 98 (only 6 labeled) in the tube's end 94. A difference between the riser component 90 and the riser component 40 is that after the coupler 92 is fixed to the tube 96, the edge 100 of the tube's end 94 is not located in the same plane as the mounting surface 102 of the coupler 92. Positioning the tube's end 94 relative to the coupler 92 as such may be desirable to protect the edge 100 from abrasion damage as one attaches the riser component 90 to another riser component (not shown).

Figure 8:
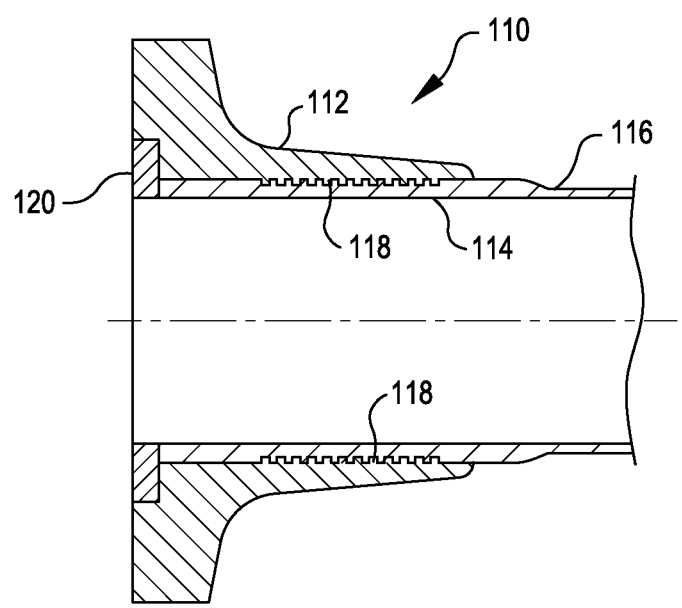
FIG. 8 is a partial, cross-sectional view of a riser component, according to another embodiment of the invention.

FIG. 8 is a partial, cross-sectional view of a riser component, according to another embodiment of the invention. The riser component 110 is similar to the riser component 40 discussed in conjunction with FIGS. 2-6. The riser component 110 includes a coupler 112 fixed to an end 114 of a tube 116 by inserting material from the coupler 112 into grooves 118 (only 2 labeled) in the tube's end 114. A difference between the riser component 110 and the riser component 40 is that the component 110 includes a ring 118 that is fastened to the coupler 112 and the tube's end 114. The ring 118 may be fastened using any desired technique, such as welding, adhering with adhesive, and/or a mechanical fastener such as a screw. The ring 118 may be desirable to protect the edge 100 and coupler 112 from abrasion damage as one attaches the riser component 90 to another riser component (not shown). The ring 118 may also be desirable to help seal the inside of the tube 116 after attaching another riser component to the component 110.

Figure 9:
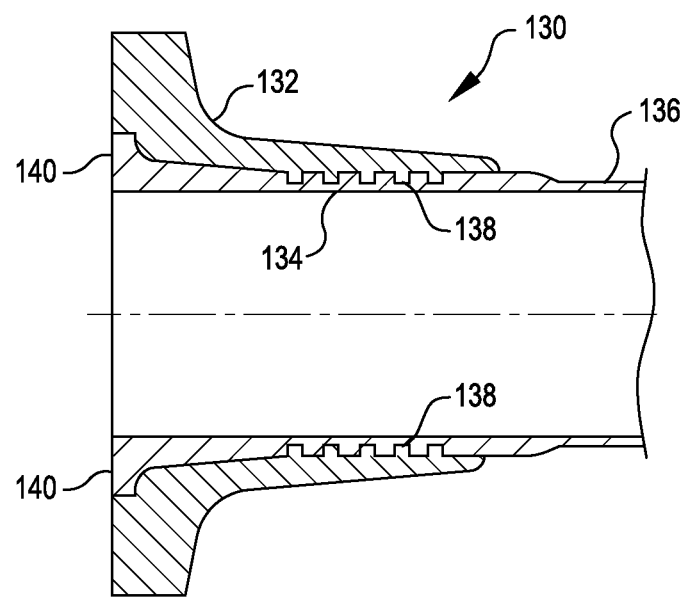
FIG. 9 is a partial, cross-sectional view of a riser component, according to yet another embodiment of the invention.

FIG. 9 is a partial, cross-sectional view of a riser component, according to yet another embodiment of the invention. The riser component 130 is similar to the riser component 40 discussed in conjunction with FIGS. 2-6. The riser component 130 includes a coupler 132 fixed to an end 134 of a tube 136 by inserting material from the coupler 132 into grooves 138 (only 2 labeled) in the tube's end 134. A difference between the riser component 130 and the riser component 40 is that the tube's end 134 flares out and includes a lip, 140. Both the flare-out and the lip may desirable to increase the strength of the riser component 130 where it mounts to other components and to help fix the coupler 132 to the tube's end 134.

What is claimed is:

1. A method for making a riser component, the method comprising:
   positioning a coupler adjacent and end of a tube such that a region of the coupler forms an interface with the tube's end, wherein the region includes a material, and the tube's end includes a groove and another material that is different than the region's material, and wherein the coupler is positioned adjacent the lube's end, the material of the coupler's region that forms the interface with the tube's end is not disposed in the groove of the tube's end;
   heating the region of the coupler to increase the region's malleability;
   exerting pressure on the region of the coupler to plastically deform the region to insert some of the region's material into the groove in the tube's end.

2. The method of claim 1 wherein the region's material includes an aluminum alloy and the material of the tube's end includes a steel alloy.

3. The method of claim 1 wherein positioning the coupler adjacent the tube's end includes inserting the tube's end into the coupler such that the whole coupler surrounds the tube's end.

4. The method of claim 1 wherein:
   the coupler includes a bore having an inside diameter;
   the tube's end includes a cylinder having an outside diameter that is shorter than the coupler's inside diameter; and
   positioning the coupler adjacent the tube's end includes inserting the tube's end into the bore.

5. The method of claim 1 wherein:
   the coupler includes a bore having an inside diameter;
   the tube's end includes a cylinder having an outside diameter that is 0.0-0.030 inches longer than the coupler's inside diameter; and
   positioning the coupler adjacent the tube's end includes heating the bore to lengthen the inside diameter, and inserting the tube's end into the bore.

6. The method of claim 1 wherein heating the region of the coupler to increase the region's malleability includes heating the region to a temperature of 600 degrees Fahrenheit.

7. The method of claim 1 wherein exerting pressure on the region of the coupler includes exerting 2000 pounds.

8. The method of claim 1 wherein exerting pressure on the region of the coupler includes exerting enough pressure to fill the groove with material from the coupler's region.

9. The method of claim 1 wherein heating the region of the coupler and exerting pressure on the region of the coupler includes rotating a tool against a surface of the coupler to generate heat from friction.

10. A riser component comprising:
    a tube having an end that includes a material and a groove;
    a coupler having a region that includes another material plastically deformed into the tube-end's groove and different than the material of the tube's end; and
    wherein the coupler is attached to the tube's end by:
       positioning the coupler adjacent the tube's end such that the region of the coupler and the groove form an interface,
       heating the region of the coupler to increase the region's malleability, and
       exerting pressure on the region to plastically deform the region to insert some of the region's material into the groove.

11. The riser component of claim 10 wherein the material of the tube's end includes a steel alloy, and the material of the coupler's region includes an aluminum alloy.

12. The riser component of claim 10 wherein the tube's end includes a longitudinal axis, and the groove extends in a direction perpendicular to the longitudinal axis.

13. The riser component of claim 10 wherein the groove includes a U-shaped cross-section having a depth of 0.125 inches and a width of 0.50 inches.

14. The riser component of claim 10 wherein the tube's end includes four grooves.

15. The riser component of claim 10 wherein the tube's end includes a longitudinal axis, and a second groove that extends perpendicular to the other groove.

16. The riser component of claim 10 wherein the tube's end includes a longitudinal axis, the coupler includes a flange radially extending away from the axis for releasably fastening the riser component to another riser component to form a riser assembly.

17. The riser component of claim 10 wherein:
    the coupler includes a flange having a mounting surface, and
    the tube's end includes and edge that is flush with the mounting surface of the coupler's flange.

18. The riser component of claim 10 wherein the riser component is a main riser operable to encase drilling-mud and a portion of a drill string.

19. The riser component of claim 10 wherein the riser component is an auxiliary riser operable to encase auxiliary lines.

20. A method for making a riser component, the method comprising:
    positioning a coupler adjacent an end of a tube such that a region of the coupler forms an interface with a region of the tube's end, wherein the coupler's region includes a groove and a material, and the tube-end's region includes another material that is different than the material of the coupler's region, and wherein when the coupler is positioned adjacent the tube's end, the material of the tube-end's region that forms the interface with the coupler's region is not disposed in the groove of the coupler's region;
    heating the tube-end's region to increase the malleability of the tube-end's region;
    exerting pressure on the tube-end's region to plastically deform the tube-end's region to insert some of the tube-end region's material into the groove in the coupler's region.

* * * * *